United States Patent
Leopold

(10) Patent No.: US 7,845,699 B2
(45) Date of Patent: Dec. 7, 2010

(54) MOTOR VEHICLE ROOF

(75) Inventor: Frank Leopold, Taunusstein-Orlen (DE)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/145,070

(22) Filed: Jun. 24, 2008

(65) Prior Publication Data

US 2009/0001773 A1 Jan. 1, 2009

(30) Foreign Application Priority Data

Jun. 26, 2007 (DE) .................. 10 2007 029 581

(51) Int. Cl.
*B60R 9/04* (2006.01)

(52) U.S. Cl. ............... 296/26.04; 296/37.7; 296/180.1

(58) Field of Classification Search ........... 296/37.7, 296/26.04, 26.06, 26.07, 217, 180.1, 165, 296/190.02, 220.01; 180/903

See application file for complete search history.

(56) References Cited

U.S. PATENT DOCUMENTS

| 3,212,812 | A | * | 10/1965 | Kurtz ................... 296/176 |
| 3,953,066 | A | * | 4/1976 | Hamilton .............. 296/160 |
| 5,421,633 | A | * | 6/1995 | Moore et al. .......... 296/165 |
| 6,394,531 | B2 | * | 5/2002 | Thompson et al. ..... 296/165 |
| 2004/0189058 | A1 | * | 9/2004 | Eiermann ............. 296/220.01 |

FOREIGN PATENT DOCUMENTS

| DE | 3039806 A1 | 7/1982 |
| DE | 3135476 A1 | 3/1983 |
| DE | 29911895 U1 | 12/1999 |
| DE | 19831133 A1 | 1/2000 |
| DE | 10302749 A1 | 7/2004 |
| DE | 10341558 A1 | 3/2005 |
| FR | 2741308 A1 | 5/1997 |
| FR | 2753938 A1 | 4/1998 |
| FR | 2753939 A1 | 4/1998 |
| JP | 2002114106 A | 4/2002 |

OTHER PUBLICATIONS

German Patent Office, German Search Report for German Application No. DE 102007029581.4, Mar. 31, 2008.
European Patent Office, European Search Report for European Application No. 08010351.8, Oct. 29, 2008.

* cited by examiner

*Primary Examiner*—Dennis H Pedder
(74) *Attorney, Agent, or Firm*—Ingrassia Fisher & Lorenz, P.C.

(57) ABSTRACT

A motor vehicle roof is provided that includes, but is not limited to a base roof and a roof segment. The roof segment is adjustable relative to the base roof. In a closed state, the roof segment fits tightly with the base roof. When opened, the roof segment is arranged to provide a space between itself and the base roof. A spoiler is provided that is connected to and adjustable relative to the base roof and kinematically connected to the roof segment in such a way that, with movement of the spoiler, the roof segment can be opened and closed. Additional storage space for the placement of baggage is formed when the roof is in an opened state.

10 Claims, 2 Drawing Sheets

MOTOR VEHICLE ROOF

CROSS-REFERENCE TO RELATED APPLICATION

This application claims priority to German Patent Application No. 102007029581.4, filed Jun. 26, 2007, which is incorporated herein by reference in its entirety.

TECHNICAL FIELD

The invention relates to a roof for motor vehicles, particularly for large-capacity passenger vehicles such as a van, station wagon or mini-bus.

BACKGROUND

From DE 198 31 133 A1, a motor vehicle roof is known to comprise a base roof with roof lining. Within the base roof, a roof segment is provided that extends across the entire base roof and which can be swung out of the base roof. When closed, the roof segment aligns itself with the surface of the base roof. When it is opened, the roof segment arranges itself essentially parallel to the starting position, in order to form a small gap between the roof segment and the base roof; this would allow for an equalization of pressure in the interior of the motor vehicle in the event of the release of one or more airbags.

The disadvantage of this type of motor vehicle roof is that the movable roof-segment involves a safety-critical building component which must not be hindered in its function. Particularly with large-capacity passenger vehicles such as vans, station wagons, or mini-buses, for example, this presents a disadvantage in that this sort of automobile is often used in order to transport objects; for example, they are used to transport luggage or bulky objects. For the functionality of a large-capacity passenger vehicle, in particular, it is therefore especially important that it be possible to transport objects on the roof. The ability to transport objects on the roof is, however, clearly impaired by a roof segment which is extendable in the case of an emergency; no objects can be transported in the vicinity of this roof segment for reasons of safety.

Therefore, at least object is to create a motor vehicle roof which improves the transportation of objects without significantly compromising safety. In addition, other objects, desirable features, and characteristics will become apparent from the subsequent summary and detailed description and the appended claims, taken in conjunction with the accompanying drawings and this background.

SUMMARY

In accordance with an exemplary embodiment, a motor vehicle roof is provided that is particularly suitable for a large-capacity passenger vehicle such as a van, station wagon, a transporter up to about 7.5 tons, or a mini-bus. The motor vehicle roof includes, but is not limited to a base roof through which a roof lining for the motor vehicle can be developed. Furthermore, a roof segment is provided that is essentially preferably adjustable in a vertical direction relative to the base roof. In a closed state, the roof segment fits essentially very tightly with the base roof, preferably with minimal or without any intervening space. In an opened state, the roof segment is arranged with a clearance relative to the base roof. According to an exemplary embodiment, an adjustable spoiler is connected to the base roof. The spoiler is kinematically connected to the roof segment in such a way that the roof segment can be opened and closed through the movement of the spoiler. Additional storage space for the baggage is formed when it is in an opened state. The additional storage space comprises an additional accessible capacity between the base roof and the roof segment in comparison to when it is closed. This space is preferably sheltered by the roof segment. The storage space is, in particular, dimensioned so that, for example, a suitcase could be stored just in the additional storage space alone.

Because the spoiler is connected with the roof segment, the roof segment can, as needed, be opened by moving the spoiler. At the same time, the spoiler prevents the air stream from pressing into the motor vehicle interior through the opened roof segment. This raises the comfort level of passenger and is particularly advantageous when airbags are released and an equalization of pressure needs to be achieved because an unnecessarily high counter-pressure is avoided. As a result of the roof segment forming a storage space, the transportation of particularly bulky objects is improved because the object to be transported can, for example, reach into the storage space from the motor vehicle interior. Even though the transport volume is higher, the aerodynamic drag is not substantially raised due to the spoiler. In particular, the spoiler can only stick out as far from the base roof as the roof segment is extended, so that an unnecessarily high aerodynamic drag is avoided through the spoiler. As a result, the motor vehicle roof can also particularly be used for small vehicles, sports cars, or super sports cars for which usually very little storage space is provided. Because the motor vehicle roof barely accentuates the aerodynamic drag when it is closed, the maximum speed for motor vehicles designed for high speeds, such as sports-cars, in particular, is not restricted; more storage space can be created, where needed, in cases when the maximum speed is of lesser importance than available transport volume. Because the roof segment makes up such a large gap between itself and the base roof so that baggage can be stored in the additional space, it is not necessary to attach baggage pieces outside of the motor vehicle roof on the surface of the roof segment, thus improving the transportation of baggage. In particular, in the case of long and/or bulky objects, it is possible to clamp these between the roof segment and the base roof, so that additional security for the cargo is ensured.

In particular, the spoiler is swivel-mounted by a pivot-axle relative to the base roof. The pivot-axle preferably runs laterally to the direction of travel. Preferably, an operating device is connected to the spoiler in order to move the spoiler. The required movement of the spoiler in order to adjust the roof segment can be activated through simple and constructive measures.

In a particularly preferred embodiment, the base roof and/or the roof segment comprises an adjustable roof element in the area of the storage space, in particular lamellae, in order to improve the accessibility to the storage space and/or the additional deposit surface. In particular, the lamellae can be arranged underneath the spoiler when they are in a compacted state: arranged one underneath the other, one over the other, one in back of the other and/or interspersed with each other, so that the lamellae can essentially be arranged in the pointy area between the spoiler and the base roof. The compacted lamellae are, in this case, arranged in the volume of the storage space which is usually used the least when loading and unloading the storage space.

Preferably, the motor vehicle roof comprises at least one activation device which is connected to the operating device. The operating device and/or at least one activation device are particularly connectable, or connected, with a left roof pillar and/or a right roof pillar of the motor vehicle body. Because the roof pillars, as structural building components of the motor vehicle body, can handle greater forces in comparison with other motor vehicle components, the operating device can brace itself on the roof pillars in order to operate the spoiler without any problems. Accordingly, the at least one operating device and/or the activation device can also be connected with at least one roof bow, which can particularly be directly and/or indirectly connected with the roof pillars.

The provision of two operating devices is particularly preferred. For example, one operating device can be connected to the left roof pillar and the other operating device can be connected with the right roof pillar. Particularly preferred are at least two operating devices connected with exactly one activation device, wherein the activation device can be operated pneumatically, hydraulically or electromagnetically; by an actuator or a linear motor. Additionally or alternatively, the activation of the activation device can happen manually with the help of a crank lever, for example. In order to develop the connections between the activation device and the operating device relatively quickly and cost-effectively, the activation device is preferably connected to a laterally aligned roof bow, which runs between the left roof pillar and the right roof pillar. In particular, the activation device is arranged concentrically so that the same means of connection can be used for the activation device and each operating device. It is also possible to switch the roof pillars and the roof bow so that the operating devices are connected to the roof bow and the activation device is connected with the roof pillar.

Preferably, the operating devices and/or the activation device are essentially arranged underneath the spoiler in a completely geodesic way. As a result, the operating device and/or the activation device are protected from environmental influences. At the same time, no building space is required which could compromise the volume of the motor vehicle interior. The activation device can, however, also be concentric to the motor vehicle or implemented in the rear section of the motor vehicle.

It is particularly preferred that the operating device comprises at least one operation lever which is, in particular, hinged to the spoiler by a hinge. On the side of the operation lever opposite the hinge, the operation lever is implemented in a slidable way. In particular, the lever is implemented in a slidable way on and/or in the roof pillar or roof bow. Preferably, the roof pillar or the roof bow is at least partially implemented as a hollow section, so that within the roof pillar or roof bow, a place for the operation lever is formed which, for example, with the help of a propelled threaded rod can be shifted in a horizontal direction in order to open or close the roof segment.

Preferably, the operation lever is rotatable on a rotation axis, which is spaced away from the pivot axle of the spoiler. Furthermore, the operation lever, spaced away from the pivot-axle, is connected to the spoiler so that the force needed to move the spoiler is less. In so doing, the operation lever can, for example, be moved along the underside of the spoiler with the help of a slide running along the spoiler.

The lever can, in particular, comprise two flexibly mounted lever components which are connected to each other. As a result, a transfer can be achieved in a very small space which would allow the movement of the spoiler over the entire height of the provided swivel radius. Furthermore, a knee lever can be formed in order to swivel the shared hinge between the lever components and the spoiler with very little movement.

In a particularly preferred embodiment, the operating levers of at least two operating devices are connected particularly through the rotatable rod around the rotation axis of the operating lever. As a result, it is possible to operate the two operating devices with exactly one activation device by simply rotating the rod.

In order to enable the most vertical opening of the roof segment, the spoiler can be implemented as slidable in the direction of travel. In particular, the spoiler and/or the operating device and/or the activation device can all be shifted relative to the base roof.

Preferably, at least one locking device is provided in order to lock the spoiler and/or the roof segment, particularly in different positions. For this purpose, a stopping device or brake can be provided which can lock the spoiler and/or the roof segment smoothly. It is particularly preferred that the locking device can be activated by remote control. As a result it is, for example, possible to lock or unlock the spoiler and/or the roof segment through the remote control signal of a motor vehicle key. Additionally, or alternatively, the spoiler and/or the roof segment can, for example, be activated electrically from the motor vehicle interior. For this purpose, a corresponding switch is provided on the driving panel.

In order to equalize, if necessary, a changing clearance between the spoiler and roof segment, a length adjustment can be provided between the roof segment and the spoiler. The length adjustment is achieved, for example, by a flexible, particularly elastic material that can simultaneously repel rain water. In order to guarantee a cinematic connection between the spoiler and the roof segment, the spoiler and the roof segment can be connected by a slide control which can be shifted lengthwise.

Preferably, at least one support device for supporting the roof segment is provided so that a portion of the arising forces of weight are not only supported by the operating device but also by the support device. The support device can, as previously described in reference to the operating device, be developed further.

Preferably, the roof segment reaches from the left roof pillar to the right pillar, wherein the entire width of the storage space can be enlarged if necessary.

In order to protect the storage space from environmental influences, a flexible protective cover can be connected with the roof segment and with the base roof. The protective cover can, for example, be developed in such a way that, when the roof segment is in a retracted state, it is folded up, and when the roof segment is in an extended state, it forms end walls for the storage space. Furthermore, the protective cover can comprise opening devices in order to open the protective cover within a sub-area. For example, the protective cover comprises a zipper in order to open the portion of the protective cover which goes against the direction of travel, so that especially long objects, such as surf boards, can be transported without additional problems.

It is particularly preferred that the roof segment feature, in a maximally opened state, comprises a vertical clearance to the base roof of $\geq$about 10 cm, in particular $\geq$about 30 cm, preferably $\geq$about 50 cm, particularly preferably $\geq$about 80 cm. Through this dimensioning of the clearance between the roof segment and the base roof, wherein the clearance is always measured from the surface of the roof segment to the surface of the base roof, a volume for the storage space that is large enough to store objects, particularly pieces of luggage or bulky objects, is achieved.

In order to ensure that objects can also be bound to the motor vehicle roof next to the adjustable roof segment without the adjustable roof segment being able to bump into the already fastened objects; it is preferred to keep a horizontally directioned offset of the roof segment as minimal as possible.

For this purpose, the roof segment can, in its maximally opened state, and in comparison with its closed state, comprise a horizontally directioned offset of≦about 10 cm, particularly≦about 5 cm, preferably≦about 2 cm, and particularly preferably≦about 1 cm and further preferably≦about 0.5 cm. Through this dimensioning of the offset, the function of the motor vehicle roof as a transport device for more objects on the motor vehicle roof is not further compromised; simultaneously, many alternative activation devices for the adjustment of the roof segment can be chosen depending on each case of application.

The embodiments of invention further applies to a motor vehicle body which is particularly provided for vans, station wagons, or mini-buses and comprises a motor vehicle roof, which can be developed and improved as described above. Preferably, a left roof pillar and a right roof pillar are provided, so that the motor vehicle roof can be safely connected with the motor vehicle body as one single module. The motor vehicle roof can, in particular, be locked to the roof pillars, so that the roof pillars can bound the base roof. Particularly, a right railing and a left railing are provided in order to aid the fastening of luggage pieces and bulky objects to the motor vehicle roof. Preferably, the roof segment, in its maximally opened state, comprises a gap between itself and the surface of the base roof which is bigger than the about 1.5-fold, in particular about 2.0-fold, preferably about 3.5-fold and particularly preferably, the about 5.0-fold of the clearance between the surface of the roof railing and the surface of the base roof. As a result of this dimensioning of the clearance between the roof segment and the base roof, an additional fastening device can be formed with the aid of the roof segment, through which an object which is to be transported can be fastened to the motor vehicle roof and, in particular, can be tied to it. For example, the object which is bound to the roof railing can be protected from the air stream during driving by the extended roof segment. It is particularly preferred that the surface of the roof segment is located at essentially the same level as the surface of the roof railing, so that the aerodynamic drag against the direction of travel is not substantially accelerated and, at the same time, that a depression in the roof lining and/or the base roof for the inclusion of the roof segment is not necessary.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any theory presented in the preceding background and summary or the following detailed description.

Figure 1:
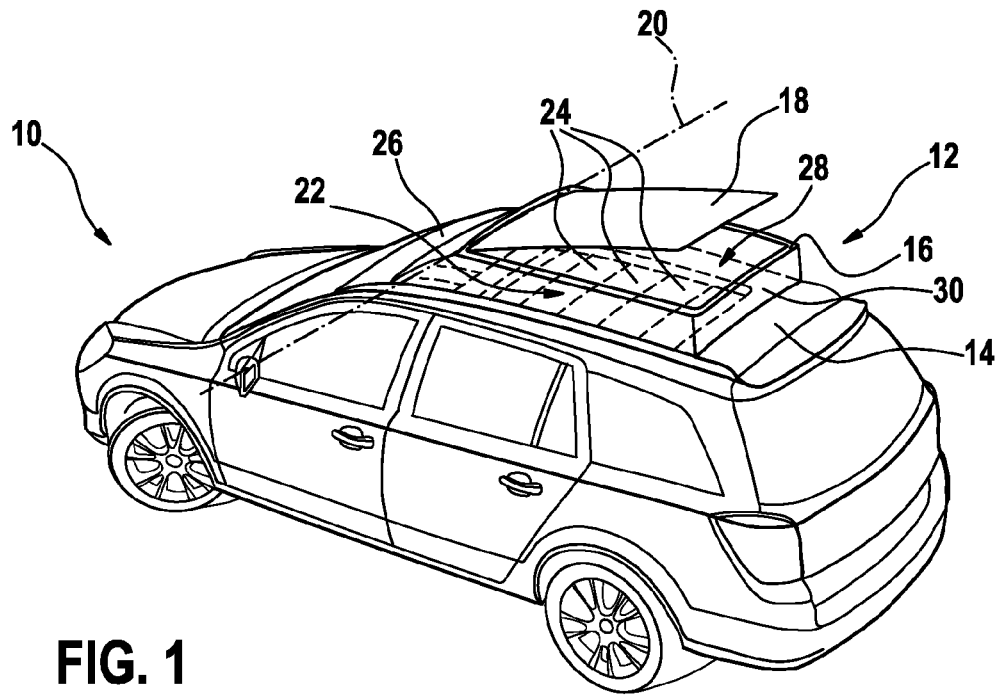
FIG. 1 shows a schematic perspective view of a motor vehicle roof in accordance with an exemplary embodiment of the invention.

A motor vehicle 10, such as presented in FIG. 1, comprises a motor vehicle roof 12, which comprises a base roof 14 and a roof segment 16, which is essentially vertically adjustable. In the presented embodiment example, the roof segment 16 comprises an upper roof element 18, which is hinged on the face of a pivot axle 20, which is arranged laterally to the direction of travel. Alternatively, the upper roof element can comprise numerous parts, which can be compacted in the same way as lamellae, for example: on top of each other, one behind the other, underneath each other or interspersed with each other.

In the presented embodiment example, the base roof 14 comprises a lower roof element 22 which comprises numerous lamellae which, in the direction of travel and/or against the direction of travel, can be compacted on top of each other or underneath each other or interspersed with each other. In order to reduce the aerodynamic drag when the roof segment 16 is extended, the roof segment 16 is connected to a spoiler 26; when the spoiler 26 moves, the roof segment 16 automatically moves along with it. The upper roof element 16 and/or the lower roof element 22 as well as the spoiler 26 can be developed as at least partially transparent in order to make possible the lighting of the motor vehicle interior 34 through sunlight. In the illustrated embodiment example, the upper roof element 16 is comparable to a window in its transparent design, while the lamellae 24 of the lower roof element are made opaque in order to provide protection from the sun, if needed.

The lower roof element 22 is particularly structured in such a way that it aligns itself with roof lining on the under part of the base roof 14 of the motor vehicle 10. Alternatively to the embodiment presented in FIG. 1, the roof element 22 can be developed in a comparable way to a window shade. Further, the roof element 22 can be engineered as a hard shell and/or a reticule.

The gap between the roof segment 16 and the base roof 14 is in an opened, that is, an extended state, and is dimensioned in such a way that a storage space 28 is developed with a volume large enough to encompass luggage and/or bulky objects. The storage space 28 comprises, in particular, a volume of at least 100 liters, preferably 200 liters and particularly preferably 300 Liters. In particular, it is possible in the presented implementation examples to use the transport volume of the motor vehicle interior as well as the transport volume of the storage space 28 for the transportation of objects because the object in the motor vehicle interior can intrude on the storage space 28 when the lower roof element 22 is open.

Between the roof segment 16 and the base roof 14, a protective cover 30 can be provided in order to protect the storage space 28 from environmental influences. The protective cover 30 is particularly designed in such a way that when the roof segment 16 is retracted, the protective cover 30 automatically folds together.

Figure 2:
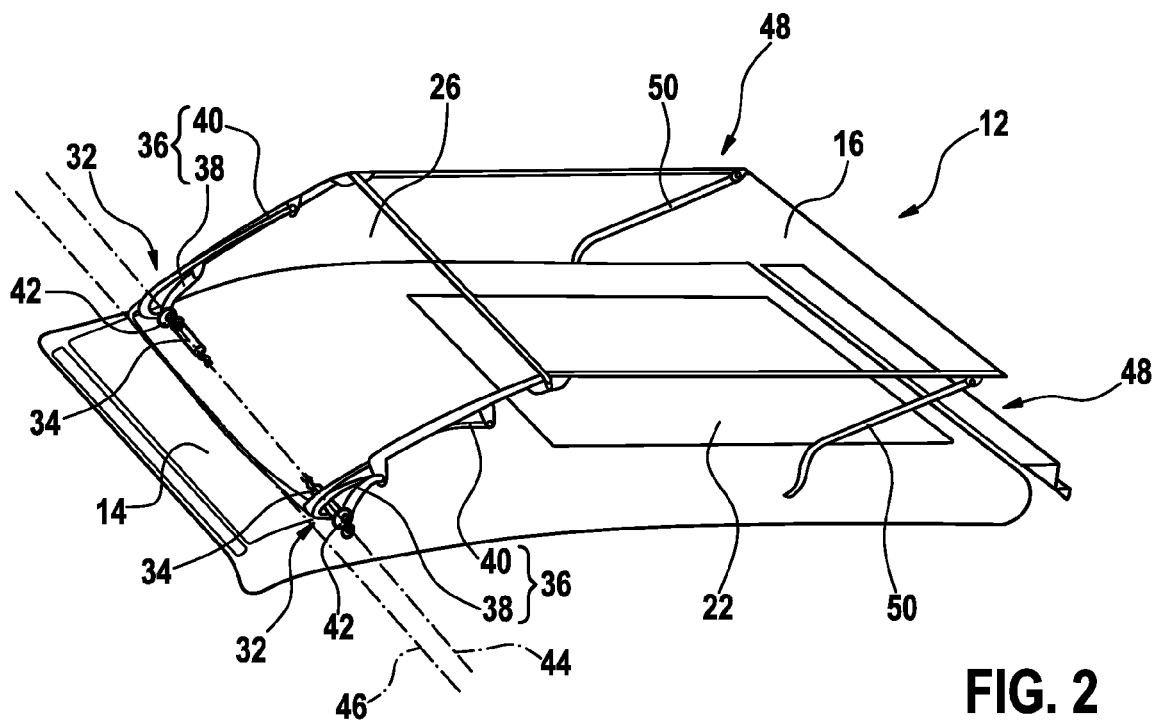
FIG. 2 shows a schematic perspective view of an initial embodiment of a motor vehicle roof.

In the embodiment of the motor vehicle roof 12 illustrated in FIG. 2, two operating devices 32 are provided which are connected to the spoiler 26, and each is activated by one respective activation device 34. Each operating device 32 comprises an operating lever 36 with a first lever component 38 and a second lever component 40 which is flexibly connected to the first lever component in order to achieve a transmission in a compacted space. In the illustrated embodiment, the activation devices 34 are developed electrically and are connected by a gear train with the first lever component 38. The operating levers 36 are rotatable around a rotation axis 44 which is spaced away from the pivot axle 46 of the spoiler 26.

Further, a support device 48 is connected with the roof segment 16. The support device 48 comprises a lever 50 implemented in a roof pillar which has not been illustrated, which is flexibly connected with the roof segment 16.

Figure 3:
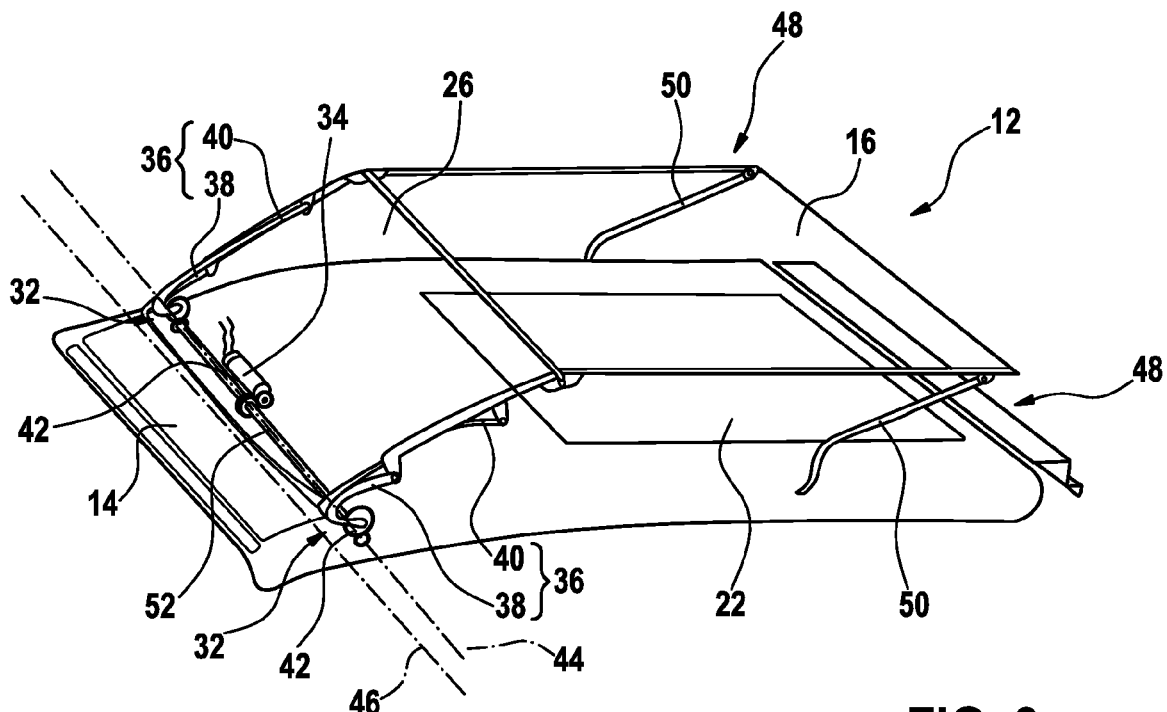
FIG. 3 shows a schematic perspective view of a second embodiment of a motor vehicle roof.

In the embodiment illustrated in FIG. 3, exactly one activation device 34 is provided compared with the embodiment in FIG. 2; this activation device activates both operating devices through a rod 52. In this way, the activation device 34 is also connected with the rod 52 through a gear train 42.

Figure 4:
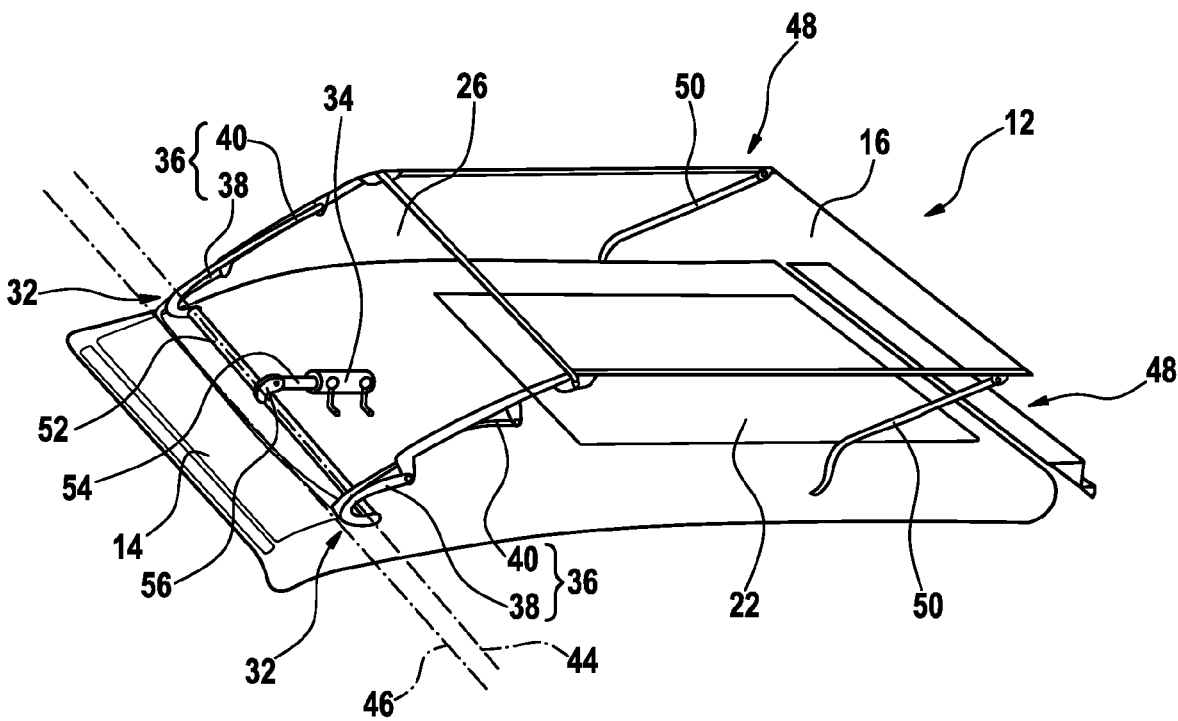
FIG. 4 shows a schematic perspective view of a third embodiment of a motor vehicle roof.

In the embodiment presented in FIG. 4, the activation device 34 is, in comparison with the embodiment illustrated in FIG. 3, developed pneumatically or hydraulically. Further, the rotation axis of the rod 52 coincides with the rotation axis 44 of the operating device because the operating levers 36 are directly connected with the rod 52. The activation device comprises a linearly moved piston 54, which rotates the rod 52 through an intermediate lever 56.

While at least one exemplary embodiment has been presented in the foregoing detailed description, it should be appreciated that a vast number of variations exist. It should also be appreciated that the exemplary embodiment or exemplary embodiments are only examples, and are not intended to limit scope, applicability, or configuration in any way. Rather, the foregoing detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A motor vehicle roof, comprising:
   a base roof;
   an adjustable roof segment moveably coupled to the base roof, the adjustable roof segment having a forward edge and a rearward edge, and the adjustable roof segment having an opened state relative to the base roof;
   a spoiler rotatably connected near its forward edge to the base roof and kinematically connected near its rearward edge to the forward edge of the adjustable roof segment such that the adjustable roof segment opens and closes in response to rotating movement of the spoiler about its pivot axis;
   a first operating device configured to move the spoiler about its pivot axis, wherein the first operating device comprises a first rotatable operation lever that rotates around a rotation axis, the rotation axis is spaced away from the pivot axis, and the first rotatable operation lever is connected with the spoiler;
   an activation device connected to the first operating device, wherein actuation of the activation device causes the first operating device to move the spoiler about its pivot axis; and
   a second operating device that is connected to the activation device, wherein the first rotatable operation lever of the first operating device and a second rotatable operation lever of the second operating device are connected with each other by a rotatable rod.

2. The motor vehicle roof according to claim 1, wherein the spoiler is swivel mounted to the base roof such that the spoiler swivels around its pivot axis.

3. The motor vehicle roof according to claim 1, wherein the first operation lever comprises a first lever component and a flexibly attached second lever component and at least one of the first lever component and the second lever component is flexibly attached to the spoiler.

4. The motor vehicle roof according to claim 1, wherein the spoiler and the first operating device are connected together, and wherein the spoiler and the first operating device are both shiftable in a forward direction relative to the base roof.

5. The motor vehicle roof according to claim 1, further comprising at least one lower roof element which is adjustable relative to the base roof in order to provide access, through the base roof, to a storage space under the adjustable roof segment.

6. The motor vehicle roof according to claim 5, wherein the lower roof element comprises lamellae which are compactable and particularly arranged in a compacted state underneath the spoiler.

7. The motor vehicle roof according to claim 1, further comprising at least one locking device for the locking of at least one of the spoiler and the roof segment.

8. The motor vehicle roof according to claim 1, wherein the roof segment comprises a vertical clearance to the base roof of about $\geq 10$ cm in a maximally opened state.

9. The motor vehicle roof according to claim 1, wherein a vertical space of about $\geq 10$ cm exists between the roof segment and the base roof.

10. The motor vehicle roof according to claim 1, further comprising a support device configured to support the roof segment, the support device connected to a first roof pillar and a second roof pillar of the motor vehicle roof.

\* \* \* \* \*